May 19, 1964
E. A. GARDNER
3,133,604
MEASURING SYSTEMS
Filed June 27, 1962
3 Sheets-Sheet 1
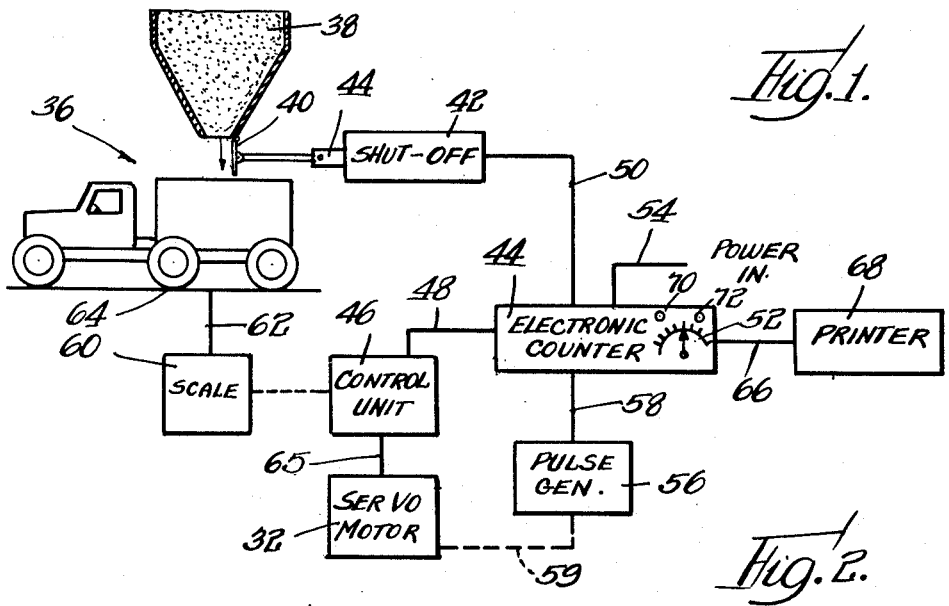
Fig. 1.
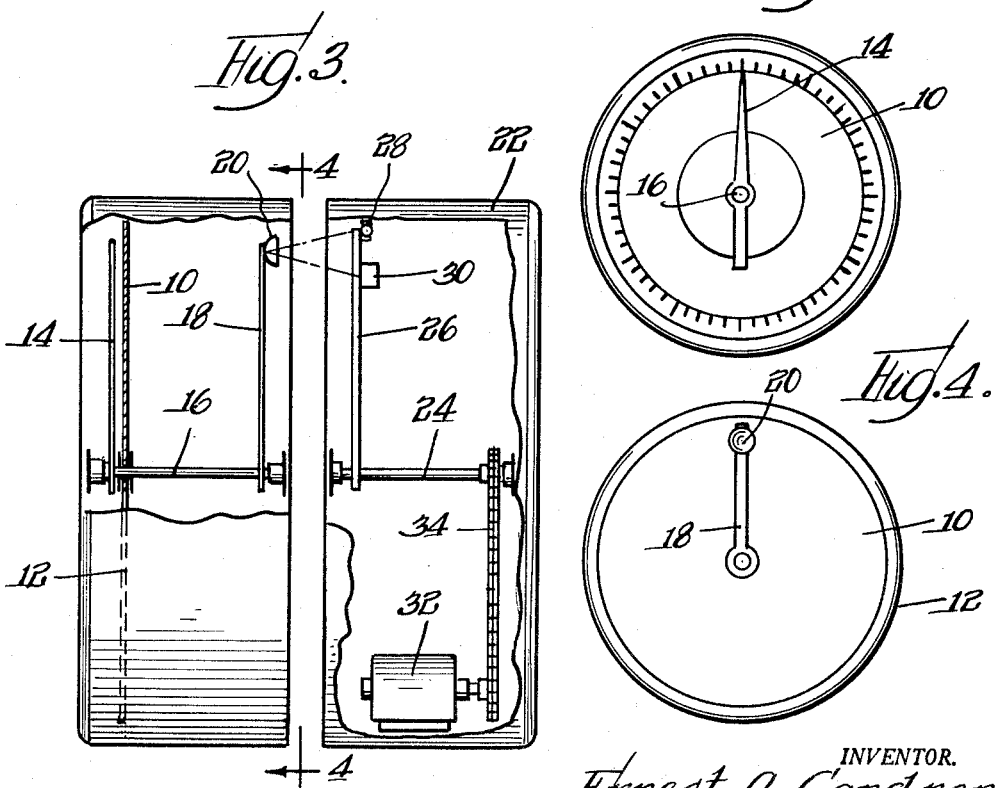
Fig. 2.
Fig. 3.
Fig. 4.
INVENTOR.
Ernest A. Gardner
BY
Olson & Trexler
Attys.

May 19, 1964    E. A. GARDNER    3,133,604
MEASURING SYSTEMS
Filed June 27, 1962    3 Sheets-Sheet 2
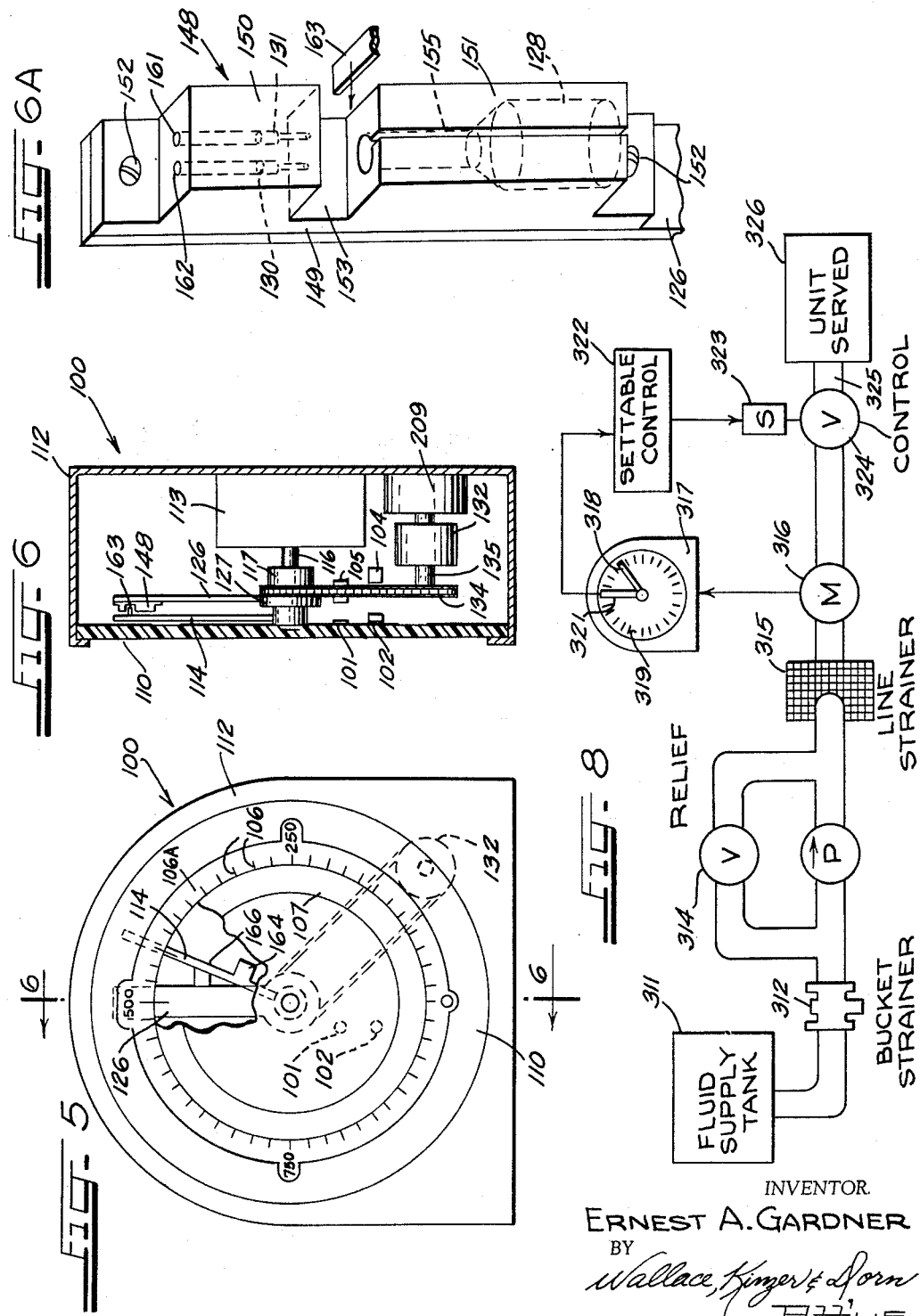
INVENTOR.
ERNEST A. GARDNER
BY
Wallace, Kinzer & Dorn
ATT'YS.

May 19, 1964   E. A. GARDNER   3,133,604
MEASURING SYSTEMS
Filed June 27, 1962   3 Sheets-Sheet 3

INVENTOR.
ERNEST A. GARDNER
BY
Wallace, Kinzer & Dorn
ATT'YS.

United States Patent Office 3,133,604
Patented May 19, 1964

3,133,604
MEASURING SYSTEMS
Ernest A. Gardner, Lyons, Ill., assignor to Count-Way, Inc., Skokie, Ill., a corporation of Illinois
Filed June 27, 1962, Ser. No. 207,151
19 Claims. (Cl. 177—1)

This invention is concerned generally with measuring systems and more particularly with systems for pre-setting the weight, volume, or other quantity of one or more materials to be incorporated in consistent batches. This application is a continuation-in-part of the co-pending application of Ernest A. Gardner, Serial No. 79,599, filed December 30, 1960.

It is common practice in many industries to deliver a quantity or batch of material to a given location. For example, a particular quantity of gravel may be dropped from a conveyor or hopper into a truck. Furthermore, a quantity of sand proportioned thereto may also be delivered to the truck, along with a desired amount of cement and water for mixing to form concrete, as in the well known concrete mixer type of truck. The problem is not unique in the building material field. Various quantities of materials, usually of a flowable nature, may be required to be delivered to a given location in many industrial applications, as, for example, in chemical plants, packaging plants for food and other materials, and other similar applications.

The quantity of material to be delivered is often determined by the weight of the material, and automatic weighing systems are known in which a balance or spring loaded device is provided with a suitable mechanism or device for producing some electrical signal proportional to the weight. This signal may be in the form of a voltage, current, frequency, reactance or other electrical value. The signal is compared with a preselected standard signal to determine when the desired amount of material has been weighed out, thus affording an analog control system. Similar arrangements may be utilized for volumetric measurement.

Prior art devices have been subject to errors, often due to environmental factors. For example, temperature, humidity, vibration, dust and other air contamination, and other factors may cause considerable variation in the output and transmission of the electrical analog signal. It is frequently difficult to maintain a desired input voltage and frequency, or to control the production of harmonics. Other electrical circuits or devices may be sufficiently proximate to the signal generating or transmission systems to introduce errors. Lack of linearity in the analog circuits may introduce rather substantial errors in converting the electrical signals to weight units and vice versa. Efforts have been made heretofore to compensate for various of the above mentioned and other variables, but such compensation may result in the introduction of new variables. Often, the new variables are little if any less troublesome than the originals.

Further errors may be introduced by cut-off devices, which may be used to signal when a weight is reached, or to stop delivery of the material automatically. Devices requiring visual determination are subject to variations in reading, and devices effecting automatic cut-off of the material flow are subject to variations in operation due to inertia of the valve or shut-off device, and also to inertia of the material being delivered.

Accordingly, it is a primary object of this invention to provide an improved measuring system for the control of batching of materials, which overcomes the difficulties of the prior art as outlined above.

It is a further object of this invention to provide a system for batching of materials by weight, volume, or other measurement basis, relying on a substantially conventional scale or the like as the basic measuring device.

Another object of this invention is to provide a batch measuring system based on digital control of the quantity measured and utilizing an electronic pulse signal and pulse counter in a novel manner to effect accurate and positive control and to determine any variations, in operation, from the desired quantities.

It is yet another object of this invention to provide a batch measuring system in which means is provided for pre-setting the quantity of material to be delivered, and for subsequently accurately measuring the quantity of the material actually delivered.

A further object of the invention is to provide a new and improved construction for a scale or similar measuring device permitting direct and accurate pre-setting to a predetermined quantity and also providing for direct visual reading of actual measurement in comparison with the pre-set quantity.

Another object of the invention is to provide continuous modulation of the discharge, in a batch measuring system, to reduce errors due to overshoot and undershoot, without requiring introduction of a separate throttling device, other than the main discharge valve, in the discharge apparatus.

Various additional objects and advantages of the present invention will be apparent from the following description when taken in conjunction with the accompanying drawings wherein:

FIG. 1 is a diagrammatic illustration of a batch weighing system constructed in accordance with one embodiment of the present invention;

FIG. 2 is a front view of a scale or weighing machine in the system of FIG. 1;

FIG. 3 is a side view of the weighing apparatus along with certain modifications and added parts;

FIG. 4 is a rear view of the scale taken approximately along the line 4—4 in FIG. 3;

FIG. 5 is a front elevation of a preferred form of measuring device, partially cut away to show internal construction;

FIG. 6 is a cross-sectional view taken approximately along line 6—6 in FIG. 5;

FIG. 6A is a detail perspective view of a part of the sensor apparatus in the measuring device of FIGS. 5 and 6;

FIG. 8 illustrates another form of measuring system in which the invention may be utilized.

Figure 7:
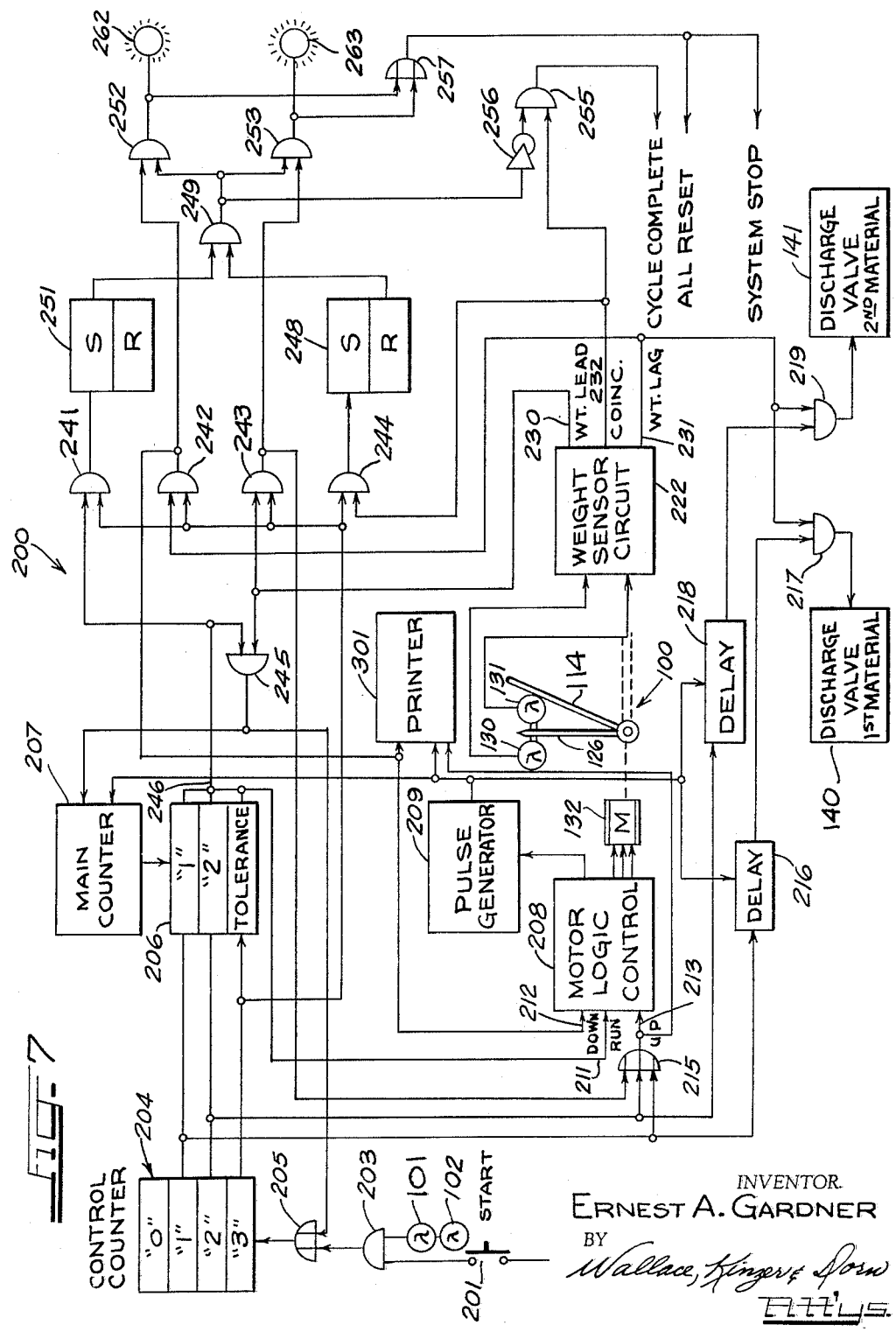
FIG. 7 is a logical circuit diagram of a preferred measuring system including the measuring device of FIGS. 5 and 6.

For an overall understanding of the initial embodiment of the invention, the weighing system of FIG. 1, it will be helpful first to refer to FIGS. 2–4, to avoid necessity of considering new details during the explanation of the overall system and operation. In particular, there is shown in FIGS. 2 and 3 a scale dial 10 having indicia thereon indicating weights, up to some given maximum such as 1,000 pounds. The dial is mounted within a casing 12, and a pointer or scale arm 14 is mounted in front of the dial on a shaft 16 extending through the dial. The shaft 16 is connected by a suitable and known weight-sensing mechanism to a weighing platform, and to counterbalance weights or springs. In a weighing operation the shaft, and hence the scale arm 14, is rotated through an angular distance corresponding to the weight on the platform.

The shaft 16 is extended rearwardly, if need be, and an auxiliary scale arm 18 is mounted on the rear end of the shaft for rotation therewith. A small mirror 20 in the form of a spherical segment, conveniently of plastic material, is mounted at or near the outer end of auxiliary arm 18, being fixed thereto in any suitable manner. Arm 18 and mirror 20 are of very low weight and inertia, and may be counterbalanced. It is convenient to use an auxiliary arm similar in construction to the scale arm 14 and to clip off the end thereof. Removal of the weight of this end portion of the auxiliary arm compensates for the slight added weight of mirror 20.

Opposite to casing 12, at the rear thereof, is an auxiliary casing 22 in optical communication with casing 12. Although auxiliary casing 22 is shown spaced somewhat from casing 12 in FIG. 3, it will be apparent that the two casings could be secured directly against one another. A rotatable shaft 24 is journalled in auxiliary casing 22 in coaxial alignment with shaft 16, and carries a radial arm 26, hereinafter referred to as a sensor arm. The outer end of arm 24 carries a light source 28 aimed in such direction as to strike the mirror 20 when auxiliary arm 18 and sensor arm 26 are angularly aligned. Light source 28 is disposed radially out beyond mirror 20, and a photosensitive device 30 is carried by sensor arm 26 radially in from mirror 20. The disposition of parts is such that when the sensor arm 26 is aligned with the auxiliary arm 18, the light beam from source 28 impinges upon mirror 20 and is reflected to the photosensitive device 30. It will be understood that the light, mirror, and photosensitive devices are illustrative of a convenient arrangement, but that other means could be utilized to determine accurate alignment of arms 18 and 26.

A servomotor 32 of known design is mounted within auxiliary casing 22, and is arranged to drive shaft 24 quite accurately, by suitable means, such as a timing chain 34.

In FIG. 1 there is shown, by way of example, a truck 36 being loaded with a suitable flowable material, for example sand. The sand is discharged into the truck from a hopper 38 having a door or closure member 40 controlled by a shut-off mechanism 42. The shut-off mechanism may, for example, comprise a hydraulic ram 44 controlled by an electrically actuated valve (not shown). Shut-off mechanism 42 is wired to and is controlled by an electronic counter 44 operating in conjunction with a control unit 46, there being an electrical connection 48 between the counter and the control unit and a further electrical connection 50 between the counter and the shut-off mechanism. Counter 70 may be of known construction, designed to count pulses very accurately. The counter is provided with a pre-setting mechanism, such as a dial and pointer 52, for pre-recording the number of pulses to be counted in a given measuring operation. Electric power is connected into the counter as is indicated at 54. A pulse generator 56, which may also be of known design, is connected by a wire or cable 58 to counter 44, and is driven by the servomotor 32 through a mechanical connection 59.

A weight-sensing mechanism 60 is indicated schematically, in FIG. 1, and includes the mechanisms previously discussed within the casing 12, and also the remaining weighing apparatus. Weight-sensing mechanism 60 is connected at 62 to a platform 64 on which truck 36 rests.

Control unit 46 includes light source 28 and photosensitive device 30, as well as relays and other electronic equipment, as will be self-evident to those skilled in the art. The control unit operates in conjunction with the electronic counter to control servomotor 32, as indicated by an electrical connection 65 from the control unit to the servomotor.

In addition to the foregoing, counter 44 is provided with a suitable electrical connection 66 leading to a printer 68 of known design for making a permanent record of the weight of material delivered.

The specific constructional details of the parts shown schematically in FIG. 1 may vary within wide limits, as will be quite apparent to those skilled in the art. It is thought the invention best will be expressed by the operation of these parts, rather than by separate and discrete details, which would only tend to obscure the overall aspects of the invention. Accordingly, the operation of the measuring system of FIG. 1 is now considered.

Assuming that it is desired to deliver a predetermined quantity of material within the range of the scale (for example, 500 pounds on a scale capable of weighing or measuring up to 1000 pounds over and above the weight of the truck), the pre-setting mechanism 52 is pre-set for 500 pounds. The truck 36 is placed on the platform 64, and means such as a push button 70 on the electronic counter is actuated to start pulse generator 56 in operation, and to count the pulses therefrom. In setting up the equipment, motor 32, pulse generator 56 and counter 44 are calibrated to establish accurate correlation between the number of pulses equal to a certain number of pounds of weight. While the counter is running, servomotor 32 is energized and the servomotor begins to run. Motor 32 rotates shaft 24, and hence swings arm 26 angularly. When counter 44 has counted a number of pulses corresponding to the number of pounds pre-set on the mechanism 52, servomotor 32 is de-energized and stops running with the arm 26 in a position corresponding to the desired number of pounds.

Automatic controls can be provided for continuing operation from this point, or control can be effected from a push button 72 which may be actuated to open the shut-off mechanism 42, thereby dropping the door 40 and allowing material to be discharged from hopper 38 and deposited in truck 36. The increasing weight on platform 64 causes operation of weighing mechanism 60 to rotate shaft 16, imparting a corresponding rotation to scale arm 14 and auxiliary arm 18. When the auxiliary arm 18 comes into alignment with sensor arm 26, the beam from light source 28 is reflected from the spherical mirror section 20 to photosensitive device 30. Photocell 30 acts, through control unit 46, to actuate shut-off device 42, thereby closing door 40 and preventing further delivery. Ideally, the truck now has the quantity of material in it equal to the number of pounds per-set on the mechanism 52.

With many materials, and for many purposes, the amount of material delivered will be quite close to the pre-set weight. However, as will be understood, inertia of the parts in closing or shutting off delivery, and the inertia of the material, may cause a slightly greater or lesser amount of material to be delivered than the amount pre-set on the counter. As indicated, this is not necessarily undesirable. However, in some instances, such as in chemical processes, the amount measured must be controlled with even greater precision. Accordingly, once shut-off device 42 has been operated, counter 44 and control unit 46 immediately cause servomotor 32 to "home," or return to zero. This also drives sensor arm 26 to its zero or "home" position. Immediately upon reaching the zero position, the control unit starts the servomotor again to swing the arm up toward its intended position.

The servomotor again acts through the mechanical connection 59 to drive pulse generator 56, and counter 44 again starts counting. Arm 26 continues until it is in alignment with auxiliary arm 18, as determined by light source 28, mirror 20, and photosensitive device 30. As soon as the arm 26 has reached this position, the control unit stops the servomotor and the electronic counter. Counter 44 then operates the printer 68 to print exactly the amount of material delivered. Thus, if inertia of the flowing material and parts is such that 502 pounds were delivered instead of the desired 500, the printer will indicate the 502 pounds.

The permanent record provided is thus accurately representative of the actual amount of material delivered. Furthermore, the next time that it is desired to deliver the same type of material, the operator can compensate therefor. Thus, using the exemplary figures heretofore adopted where it is desired to deliver 500 pounds, and 502 pounds is actually delivered, the operator can set the mechanism 52 for 498 pounds when it is desired that 500 pounds should be delivered. Other amounts can be proportioned accordingly. That is, over a limited range, such as 100 to 900 pounds, if the error in shutting off at 500 pounds is two pounds, a generally similar error will occur at 100 and 900 pounds.

The weighing system of FIGS. 1–4 is quite advantageous in that it takes advantage of pre-existing weighing or scale facilities without expensive modification thereof. All that is needed, by way of modification, is the provision of the auxiliary arm 18 and the mirror or some other device for indicating alignment with sensor arm 26. The parts added may vary quite widely in specific construction, as heretofore discussed, and many of the parts can be conveniently installed at a central office, only the servomotor and arm 26 and associated mechanism requiring mounting adjacent the scale.

The system can be operated cumulatively to provide a succession of desired weight quantities and print out of the total weight by appropriate operation of the counter and control unit, as by use of known punched tape or other coded program techniques; a cumulative system is described in greater detail in connection with FIGS. 5–8.

FIGS. 5, 6 and 6A illustrate the principal mechanical components of a cumulative weighing system 200 for which the control apparatus is illustrated in schematic form in FIG. 7. The scale apparatus 100 shown in FIGS. 5 and 6 comprises a dial scale member 110 graduated in appropriate weight increments; again, it is assumed that the capacity of the scale is one thousand pounds but this could be any other selected capacity, depending upon the application. Scale member 110 is mounted in a suitable casing 112 which also serves as a housing for a conventional weighing mechanism 113. Weighing mechanism 113 is connected by a suitable shaft 116 to a scale arm 114 located immediately behind scale member 110. Shaft 116 may be journalled in a suitable bearing 117 supported from the casing 12 by appropriate structural members (not shown). In a weighing operation, shaft 116 and scale arm 114 are rotated through an angular distance corresponding to the weight on a platform that may be mechanically connected to weighing mechanism 113 in conventional manner.

The scale apparatus 100 of FIGS. 5 and 6 further includes a sensor arm 126 that projects outwardly from a sensor arm bearing member 127. Bearing member 127 is mounted in co-axial alignment with shaft 117, preferably being supported by the fixed bearing member 117 that also supports the central portion of the shaft. Bearing member 127 and arm 126 do not rotate, however, in response to rotation of shaft 116. Instead, independent means are provided for rotating sensor arm 126 to any desired angular orientation relative to scale member 110, as described more fully hereinafter.

Sensor arm 126 is located immediately behind scale arm 114 within casing 112. The radial outer end of sensor arm 126 carries a sensing unit 148 that is shown in detail in FIG. 6A. The sensing unit comprises a base member 149 having an upper housing section 150 and a lower housing section 151. Base member 149 is secured to sensor arm 126 by suitable means such as a pair of mounting screws 152. The two housing sections 150 and 151 of the base unit are separated by a gap or slot 153.

Upper housing section 150 of sensing unit base member 149 is provided with a pair of sockets or receptacles 161 and 162 in which a pair of sensing photocells 131 and 130 are mounted. Photocells 131 and 130 face the gap 153 between the two housing sections of sensing unit 148. The lower housing section 151 of the sensing unit provides a receptacle or socket 155 for a suitable light source 128 that is positioned to illuminate both of the photocells 131 and 130 when there is no obstruction in gap 153. Gap 153 of sensing unit 148 is radially aligned with a small projection or flag 163 mounted upon scale arm 114. Flag 163 is just wide enough to block illumination to both of the sensing photocells 131 and 130 when the flag is accurately aligned with the center of gap 153. On the other hand, flag 163 is narrow enough so that if there is even a small angular misalignment, with respect to the center line of sensing unit 148, then the flag will block illumination of only one of photocells 131 and 130, depending upon the direction of misalignment.

The drive arrangement employed for sensor arm 126 is essentially similar to that utilized in connection with sensor arm 26 in the first-described embodiment. Thus, a suitable motor 132 is mounted within casing 112 and is connected by an accurate chain, timing belt, or similar drive 134 to the hub or bearing member 127 on which sensor arm 126 is mounted. In the illustrated arrangement, a single drive chain is illustrated, but it may be desirable to utilize a more complex drive arrangement to afford a substantial differential between rotation of the motor shaft and rotation of the sensor arm. Shaft 135 of motor 132 is also connected to a pulse generator 209, the operation of which is described in greater detail hereinafter in connection with FIG. 7.

In addition to flag 163, scale arm 114 is provided with an additional projection or flag 164. Flag 164 is positioned to interrupt illumination of a scale-empty photocell 102 that is mounted within casing 112 in position for illumination by a suitable light source 104. Similarly, sensor arm 126 is provided with a projection or flag 166 that interrupts illumination of a scale-empty sensing photocell 101 when the sensor arm is at the zero position of the scale, cell 101 being illuminated from a suitable source 105.

Preferably, most of dial scale member 110 is substantially opaque, but the scale markings 106 are located in an annular light-colored opaque field 106A immediately radially beyond an annular transparent portion 107. The scale member may be fabricated from a relatively rugged but transparent plastic sheet and the peripheral and inner portions of the scale member may be printed or otherwise treated to render the same opaque. Scale markings 106 are preferably printed, engraved, or otherwise formed on the inner surface of the scale member. Accordingly, scale arm 114 is located immediately behind scale markings 106 so that there is little or no parallax problem insofar as visual reading of the scale is concerned. Even more important is the fact that the sensor arm 126 is also located immediately behind the scale member and is spaced only a very short distance from scale markings 106. This makes it possible to read the positioning of sensor arm 126 directly and with virtually no error in the use of scale mechanism 100. Consequently, immediate and direct observation of a pre-set weighing value represented by the angular position of sensor arm 126 is made possible by the construction of scale mechanism 100 and particularly scale member 110 and sensor arm 126.

FIG. 7 illustrates, in substantially simplified form, the logical circuit arrangement employed in a preferred embodiment of the present invention, utilizing the apparatus illustrated in FIGS. 5, 6 and 6A. The two-material batch forming weighing system 200 illustrated in FIG. 7 comprises a main starting switch 201 that is connected to an AND gate 203, the other input to the AND gate being from the scale-empty photocell 101 and the zero-sensing photocell 102 for the sensor arm 126. The output of AND gate 203 is connected to one input of an OR circuit 205 having its output connected to a control counter 204.

Control counter 204 may take several forms, insofar as electrical and mechanical construction may be concerned. Essentially, this device is an electrically actuated stepping switch having four levels identified in FIG. 7 as levels "0," "1," "2" and "3." The "0" level of control counter 204 is a normal or inactive level. The remaining levels "1," "2" and "3" of the control counter are provided with individual output circuits connected to the "1," "2" and "3" levels of a three-stage comparator 206.

Comparator 206 comprises a multiple-level comparison device that may be pre-set to predetermined levels indicative of weights, volumes, or other quantities being measured. In system 200, weight is the basis of measurement. For example, the comparator may comprise, in each level, a series of comparison switches. However, other apparatus capable of recording a pre-set quantity and comparing that quantity with the output of a counter or other similar apparatus may be utilized for the comparator 206 as desired.

Comparator 206 is provided with a second input to all stages, the second input being derived from a main counter 207. Counter 207 is actuated by stepping pulses derived from a pulse generator 209 connected to a motor control unit 208 employed to actuate motor 132. Control unit 208 is provided with three inputs 211, 212 and 213 identified in FIG. 7 as the "run," "down," and "up" inputs respectively. Whenever motor 132 is to be actuated, actuating signals must be supplied to "run" input 211 of control unit 208 and also to one of the inputs 212 and 213, depending upon the direction in which the sensor arm 126 is to be driven.

The output circuits from the "1" and "2" levels of control counter 204 are each connected to an OR gate 215 that is connected to the "up" input of motor control 208. The output from the "1" stage of the control counter is also connected, through a delay circuit comprising a counter 216, to an AND gate 217 that controls the first discharge valve 140 of the batching system. Similarly, the output of the second level of control counter 204 is connected through a delay counter 218 to an AND gate 219 that controls the second discharge valve 141. Both of delay devices 216 and 218 are connected to the output line 221 from stepping pulse generator 209 that also carries the stepping pulses to main counter 207.

The leading and lagging sensor photocells 130 and 131 are individually electrically connected to a weight sensor circuit 222 having three outputs 230, 231 and 232. Output 230 provides an actuating signal when the scale arm 114 leads sensor arm 126, showing a weight on the scale greater than the setting of the sensor arm. Output 231 produces an actuating signal whenever the scale arm lags the sensor arm. Output 232 is a coincidence output indicating precise coincident alignment of arms 114 and 126.

The weight-lagging output circuit 231 of sensor circuit 222 is connected to the input of each of the AND gates 217 and 219. In addition, the weight-lagging output circuit is connected to the second circuit 242 in a series of four AND circuits 241, 242, 243 and 244. All of the AND circuits 241–244 are connected, at one input, to the output from the third stage of control counter 204. Thus, it is seen that AND circuit 242 produces an output signal in response to actuating signals from the weight-lagging output 231 of sensor circuit 222 whenever control counter 204 is in its "3" operating condition.

The weight-leading output circuit 230 is connected to the second input of AND circuit 243 and is also connected to a further AND circuit 245. Circuit 245 has a second input that is connected to the outputs of all three stages in comparator 206, designated in FIG. 7 as coincidence output circuit 246. The coincidence output from comparator 206 is also connected to AND circuit 241 and to the "run" input 211 of motor control 208. Gate 245 is a re-setting device and is connected to a re-set input of main counter 207 and to OR circuit 205, being utilized to re-set both the main counter and the control counter as described more fully hereinafter.

The second input to AND gate 244 is taken from the coincidence output 232 of weight sensor circuit 222. The output of AND gate 244 is connected to the "set" stage of a flip-flop circuit 248, the output of the re-set stage of flip-flop 248 being connected to one input of an over-under AND gate 249. The second input of AND gate 249 is derived from the "set" stage of a second flip-flop 251, the input to flip-flop 251 being derived from the output of AND gate 241. The output of AND circuit 249 is connected to one input of each of two further AND circuits 252 and 253. AND gate 252 is utilized to indicate an underweight condition and has a second input that is connected to the output of AND gate 242. Gate 253, on the other hand, is employed to detect an overweight condition and has its second input connected to the output of AND gate 243.

Gates 242 and 243 are used to control the direction of movement of sensor arm 126. Thus, the output of gate 242 is connected to the "down" input 212 of motor control 208. Similarly, the output of gate 243 is connected to one input of OR circuit 215 in the "up" input circuit 213 of the motor control unit.

The third output of sensor circuit 222, coincidence output 232, is also connected to an AND gate 255. The second input to gate 255 is derived from the output of gate 249, an inverter 256 being connected in this circuit. The output of AND gate 255 is utilized to reset all of the operating circuits of system 200, the multiple reset connections not being shown in the drawing. A further reset arrangement is provided under the control of the underweight and overweight AND gates 252 and 253. Thus, the output of each of these gates is connected to an OR circuit 257 having an output that is also connected to the reset circuits of the system. In addition, the output of OR gate 257 is connected to a suitable master relay or the like (not shown) to prevent further operation of the system, since an output from OR gate 257 indicates an out-of-tolerance measuring operation. Preferably, underweight and overweight indicator lamps 262 and 263 are connected to the outputs of gates 252 and 253 respectively to afford an immediate indication to the system operator as to the nature of failure of system operation.

When system 200 is placed in operation, it is first necessary to set the "1" stage of comparator 206 with the desired quantity of the first material to be discharged, in each batch, through valve 140. Similarly, the second level of comparator 206 is pre-set to indicate the quantity of material to be discharged through valve 141 and thereby added to the material from valve 140. The third level of comparator 206 is pre-set with the permissible tolerance for the batching operation. For example, if the total weight of material in the batch, from both valves 140 and 141, is to be one thousand pounds, and a tolerance of ten pounds is permitted, then the "3" level of comparator 206 is set for a total quantity of ten pounds.

When the system is placed in operation, it may be assumed that there is no weight on the scale and that scale arm 114 is at its zero or "home" position, masking photocell 101. Sensor arm 126 would also be at the zero position. Under these conditions, closing of start switch 201 produces an actuating signal which, together with the output of the scale-empty photocell 101 and sensor zero photocell 102, actuates AND gate 203. The AND gate produces an output signal that is supplied to control counter 204 through OR gate 205, triggering the control counter from its normal or "zero" operating condition to the first active condition. This produces an output signal from the "1" level of the control counter.

The output signal from control counter 204, at the "1" level, energizes the first level of comparator 206. This same signal is supplied to motor control unit 208, through OR gate 215 and the "up" input 213, conditioning the motor control to drive motor 132 and rotate sensor arm 126 from its rest position toward a predetermined weight setting. Further, the output signal from control counter 204 actuates delay counter 216, but the delay counter does not yet provide an actuating signal to the AND gate 217 that controls the first discharge valve 140.

As soon as the first level of comparator 206 is actuated, it produces an initial output signal in circuit 246 indicating a lack of coincidence between the output from main counter 207 and the pre-set value, for the first material, that is recorded in the first level of the comparator. This signal, supplied to the "run" input 211 of motor control circuit 208, in conjunction with the input signal supplied to the "up" input 213, as described above, starts motor 132 and begins the movement of sensor arm 126 toward the pre-selected weight of the first material.

When motor 132 is started, pulse generator 209 is also actuated, producing a series of stepping pulses representative of rotation of the motor and of sensor arm 126. These pulses are supplied to main counter 207 and to delay counter 216. Counter 207 continues to count the pulses, supplying the total count as an output signal to comparator 206. This operation is maintained until the total count of counter 207 reaches the pre-set value recorded in the first stage of comparator 206. When this happens, the signal supplied to output circuit 246 of the comparator changes, indicating coincidence between the quantity that has been pre-set in the first level of the comparator and the count of the main counter. This change in the output signal from the comparator is effective to interrupt operation of the motor, by interrupting the necessary actuating signal at the "run" input 211 to motor control unit 208.

In the first part of the initial weighing operation, there is no output signal from delay counter 216 to AND circuit 217. The delay counter counts the stepping pulses from output 221 of generator 209 and compares the total count of these pulses with a pre-set delay count. This delay count is made substantially less than the count preset in the first level of comparator 206. Consequently, delay counter 216 counts out before the sensor arm 126 reaches the predetermined weight for the first material. At this time, counter 216 produces an output signal which is applied to AND gate 217. At the same time, since scale arm 114 is well behind sensor arm 126, there is an output signal from the weight-lagging output 231 of sensor circuit unit 222. Accordingly, gate 217 is energized and acuates valve 140 to begin the discharge of the first material on to the batching scale.

As the weight of the first material accumulates on the scale, scale arm 114 may swing past the sensor arm 126, indicating that discharge of the first material is too rapid and that the weight is leading the sensor arm movement. If this occurs, the output signal from the weight-lagging output 231 of sensor circuit 222 is interrupted, de-energizing AND gate 217. This closes valve 140 and interrupts discharge of the first material until such time as an output signal from circuit 231 again indicates that the weight on the scale is less than the present weight setting of sensor arm 126.

The foregoing operation, entailing interruption of discharge of the first material, may take place a number of times, particularly near the end of the weighing cycle. That is, if the discharge rate for the first material is slightly greater than the normal rate of movement of the sensor arm 126 toward its final pre-set value, valve 140 will be opened and closed a number of times in the latter part of the weighing operation. This continuous sensing and control operation provides what may be termed a modulation of the discharge of the first material, minimizing the possibility of any substantial over or underweight condition during the latter part of the weighing operation. This makes it unnecessary to provide for throttling or "bleeding" in the latter part of the weighing cycle, yet affords an accurate measurement of the material being weighed.

The initial or non-coincidence output signal from comparator 206 is not a signal capable of triggering either of the AND gates 241 and 245. Rather, these two AND gates are made responsive to the coincidence signal produced by circuit 246 when the count in main counter 207 corresponds to that pre-set in the comparator. Consequently, when comparator 206 counts out, actuating signals are supplied to both AND gates 241 and 245. The normal overshoot of the system, as the last of the material from valve 140 settles on the scale, produces an output signal from the weight-leading output 230 of sensor circuit 222. This output signal is ordinarily produced even though the weight actually discharged on to the scale may not exceed the pre-set value, and results from the inertia of the scale itself. This signal, supplied to AND gate 245 together with the coincidence signal from circuit 246, causes the AND gate to produce an output signal that is supplied to main counter 207, in a reset circuit, resetting the main counter to zero. The same signal is supplied through OR circuit 205 to control counter 204, actuating the control counter to its "2" level. This actuation of the control counter is effective to break the operating circuit to the "1" level of comparator 206 and to establish a new energizing circuit to the second level of the comparator.

With the comparator 206 operating at its second level, operation proceeds as described hereinabove. Sensor arm 126 is again driven in the "up" direction toward a higher weight setting. This operation is continued until the count in counter 207 coincides with that in the "2" level of comparator 206, at which time movement of the sensor arm is again interrupted. Meanwhile, after a delay produced by the device 216, AND gate 219 is actuated to open valve 141 and initiate a discharge of the second material on to the scale. Again, in at least the latter part of the weighing operation the discharge through valve 141 is modulated by continuous sensing of the position of scale arm 141 relative to the sensing photocells 130 and 131 carried by sensor arm 126.

When comparator 206 determines that the pre-recorded count in its second level is matched by that of the main counter 207, thereby indicating that the sensor arm 126 has reached the position corresponding to the quantity of the second material to be incorporated in the batch, circuit 246 again produces an output signal indicative of coincidence. As before, this interrupts the actuating signal normally supplied by circuit 246 to the "run" input 211 of the motor logic control 208, interrupting operation of motor 132. At the same time an actuating pulse is again supplied to AND gate 245 which resets main counter 207 and actuates control counter 204 to its "3" or tolerance level. As before, actuation of AND gate 245 depends upon an output signal from the weight-leading output 230 of sensor circuit 222, this signal being produced by the normal overshoot of the weighing apparatus.

Control counter 204, when actuated to its "3" level, actuates comparator 206 to its third or tolerance setting. As noted above, the third level of the comparator has recorded therein a permissible tolerance for the weighing system. Since main counter 207 has been returned to zero, circuit 246 again produces a signal indicating lack of coincidence between the setting of the effective level of the comparator and the count in the main counter.

Consequently, an actuating signal is again supplied to the "run" input 211 of motor control 208.

In this instance, however, there is no direct connection from control counter 204 to the "up" input 213 of the motor control. Instead, motor 132 may now be actuated to turn in either direction, depending upon the actual weight of the material on the scale, as described more fully hereinafter.

Initially, a condition may be considered in which the total weight on the scale exceeds the weight corresponding to the setting of sensor arm 126, corresponding to the desired total weight of the batch. If this is the case, an actuating signal is produced at the weight-leading output 230 of sensor circuit 222, and this signal is supplied to AND gate 243. At the same time, gate 243 receives an actuating signal from the "3" stages of control counter 204, this same signal being supplied also to gates 241, 242 and 244. Gate 243, accordingly, is actuated and supplies an output signal to the "up" input 213 of motor control 208. This starts motor 132 in operation, moving arm 126 toward a higher weight and, accordingly, toward alignment with scale arm 114. At the same time, the output signal from AND gate 243 is supplied to the overweight AND gate 253.

If the total weight is enough overweight to be beyond the tolerance pre-set into level "3" of comparator 206, then the comparator counts out before scale arm 114 reaches the coincidence location intermediate sensing photocells 130 and 131. When the comparator records coincidence between the count in main counter 207 and the maximum permissible tolerance recorded in the comparator, a coincidence signal is again produced in output circuit 246. This signal is supplied to gate 241, the second input to gate 241 already being energized by a signal from control counter 204. Consequently, flip-flop 251 is actuated to produce an output signal effective to actuate gate 249. Normally, gate 249 continuously receives an actuating signal from flip-flop 248. When gate 249 is actuated, the output from this circuit and the output from AND gate 243 combine to actuate the overweight AND gate 253. This energizes signal lamp 263 to inform the operator that an overweight condition that is out of tolerance has been reached in the preceding weighing cycle. At the same time, the system is automatically stopped in its operation, by the circuit through OR gate 257, and is reset. Preferably, the system stop operation should disable the system until some positive action is taken by the operator to correct conditions that have led to an overweight operation.

Normally, however, the overweight condition is less than the tolerance recorded in stage "3" of comparator 206. Accordingly, scale arm 114 reaches the coincidence position intermediate sensors 130 and 131 before comparator 206 counts out. Under these circumstances, an output signal is produced at terminal 232 of sensor circuit 222, which signal is supplied to AND gate 244 and to AND gate 255. The normal output from gate 249 and inverter circuit 256, as applied to AND gate 255, is of a sense to actuate gate 255. Consequently, occurrence of the coincidence signal from circuit 222, through output circuit 232, actuates AND gate 255 to produce a signal used to reset the system ready for the next weighing operation. In this sequence of operations, the actuation of gate 244 does not directly affect system operation.

It is equally likely that the ultimate weight deposited on the batching scale will be less than the predetermined desired total for the first and second materials. If this is the case, at the time the control counter is triggered to its "3" level, an actuating signal is produced at the weight-lagging output 231 of sensing circuit 222. This being the case, AND gate 242 is actuated by the signal from sensor circuit 222 and from the control counter. The output and AND gate 242 supplies an actuating signal to the "down" terminal 212 of the motor control. Thus, in this instance motor 132 drives the sensor arm 126 back toward the scale arm 114, which has settled down at a position indicating a lesser weight than that intended for the batch of both materials.

As before, the underweight condition may be greater than the tolerance permitted by the pre-set value in level "3" of comparator 206. If this is the case, comparator 206 counts out before movement of the sensor arm 126 brings the arm into coincidental alignment with scale arm 114. When this happens, the output signal to the "run" terminal 211 of the motor control is interrupted. At the same time, an actuating signal is supplied to AND circuit 241, which already receives a complementary actuating signal from the "3" level of control counter 204. Actuation of AND circuit 241 produces an output signal that actuates flip-flop circuit 251 and supplies an actuating signal to gate 249. As before, the normal output of flip-flop 248 is an actuating signal for gate 249, so that this AND gate produces an output signal that is supplied to the succeeding AND gates 252 and 253.

Only AND gate 252 receives the requisite second actuating signal (from gate 242). In this instance, therefore, indicator lamp 262 is energized, indicating to the machine operator that an out-of-tolerance underweight condition has occurred. At the same time, the output signal from gate 252 supplies operation of the system and resets it for subsequent operation.

On an underweight condition, of course, the usual operation will be such that the weight on the scales will be well within the tolerance established by the recorded data in the third level of comparator 206. As long as this is the case, arm 126 moves into coincidence with scale arm 114 before comparator 206 counts out, producing an output signal at terminal 232 of sensor circuit 222. Again, this produces an actuating signal effective to trigger AND gate 255 which normaly receives a second actuating signal, continuously, from AND gate 249. As before, this completes the weighing cycle and the complete system is reset by the output signal from gate 255, ready to start another operation by actuation of start switch 201.

As in the first-described embodiment, it may be desirable to provide some means for preparing a written record of the actual quantity of material delivered under the control of system 200 (FIG. 7). To this end, a printer 301 may be incorporated in the system. The printer is connected to the output of pulse generator 209 and includes a counter mechanism for counting the pulse output. In addition, the printer may be provided with electrical connections to the "down" and "up" terminals of motor control unit 208, in order that any pulse output developed on a "down" movement may be subtracted from the total number of pulses produced on the "up" movement of the sensor arm. The particular form of apparatus employed in printer 301 to determine the net pulse count and, accordingly, the net weight delivered by the system, is not critical to the present invention and conventional apparatus capable of accomplishing this is known in the art. Accordingly, no detailed description of the printer mechanism is provided herein.

In the foregoing description, the sensing photocell in each instance is mounted upon the sensor arm. Thus, photocell 30 in the initial embodiment is mounted upon sensor arm 26, and photocells 130 and 131 in the second embodiment are mounted upon sensor arm 126. It is not essential that this relationship be maintained, however. That is, the sensing devices may be mounted upon indicator arm 14 or on indicator arm 114, in the two different embodiments, without in any way departing from the present invention. Ordinarily, however, it is desirable to locate the sensing devices on the sensor arm in order to avoid any substantial addition to the weight of the scale indicator arm. This makes it possible to use a conventional weighing or other measuring mechanism without substantial modification, since the sensor arm is not mechanically connected to the indicator arm and does not add to the weight or inertia of the measurement indicator.

A conventional mechanical weighing scale of the kind with which the present invention may be employed is not a completely linear device. With reference to FIGS. 5 and 6, the conventional weighing mechanism 113 is ordinarily precisely accurate only at the reference or zero position and at a position one-half the distance around the scale. At all intermediate positions there is some minor error, the weight-versus-scale reading characteristic usually being of substantially sinusoidal configuration. Thus, with the scale illustrated in FIG. 5, precisely accurate readings and weighing operations can be attained only at the five-hundred-pound level; maximum error occurs at settings of two-hundred fifty and five hundred pounds. Ordinarily, the conventional weighing mechanism is sufficiently accurate even at the intermediate settings, but this may not be true in a given precision weighing operation.

Even these minor errors can be compensated by utilizing a pulse generator 209 that is directly calibrated in accordance with the actual weight applied to the scale. For example, a magnetic tape or other recording can be made by adding incremental weights to the measuring system and thereafter accurately determining the position for sensor arm 126 required to align the sensor arm precisely with indicator arm 114. This is a relatively time consuming and tedious process but, when accomplished, affords a pulse generator signal source that is even more accurate than the scale markings 106 of weighing mechanism 100. Ordinarily, it will be necessary to adopt this technique only where the material being weighed or otherwise measured is required to be dispensed with extreme accuracy.

As thus far described, the present invention is applied to measuring systems in which measurement is accomplished in accordance with the weight of the material being delivered to a given location. The invention, however, is applicable without substantial change to other material delivery systems where measurement is predicated upon some other parameter relating to the material being handled.

FIG. 8 illustrates, in greatly simplified form, another application for the present invention. The system 310 shown in FIG. 8 comprises a fluid supply tank 311 that is connected through a conventional strainer 312 to a delivery pump 313. Pump 313 is bypassed by the usual relief valve 314, which may be manually or electrically operated. The output of pump 313 is supplied through a line strainer 315 to a flow meter 316. Meter 316 produces an electrical signal representative of the rate of flow of fluid through the meter. The output signal from metering device 316 is supplied to an integrating instrument 317 of the rotary kind having an indicator arm 318 that is movable in relation to an indicating scale 319. Thus, indicator arm 318 performs the same function as indicator arm 113 in the embodiment of FIGS. 5–7.

The measuring instrument 317 further includes a sensor arm 321 that carries a sensing unit such as the sensing unit 148 described in detail hereinabove in connection with FIG. 6A. The photocells or comparable sensing elements on sensor arm 321 are electrically connected to a control system 322. Control unit 322 may comprise a control system essentially similar to that illustrated in FIG. 1 or may be of the type shown in FIG. 7 but modified to apply to the measurement of only one material. The output signal from control circuit 322 is connected to the operating solenoid 323 of a main control valve 324. Control valve 324 is interposed in a conduit 325 connecting flow meter 316 to a unit 326 that is to receive fluid from supply tank 311.

The system of FIG. 8 operates in the same manner as the previously described embodiments except that the basis of measurement is the volume of liquid passing through meter 316 instead of the weight of the material supplied to the scale platform. Pump 313 constitutes a material delivery means comparable to the gravity feed of material from hopper 38 in the system 31. Meter 316 and instrument 317 together afford a means for cumulatively measuring the quantity of material delivered to unit 326, and thus perform the same basic function as provided by scale 60 in system of FIGS. 1–4 and scale 100 in the system of FIGS. 5–7. As pointed out above, the indicator arm 318 of instrument 317 serves the same function as indicator arms 14 and 114 in the weighing systems.

In the fluid measurement system of FIG. 8, it would be of course necessary to provide a suitable reversible motor for moving sensor arm 321 along the annular path defined by scale markings 319. Control unit 322 includes a settable electronic counter or other settable control means for actuating the motor to pre-set sensor member 321 to a predetermined position on its path of movement that is representative of a given quantity of fluid to be supplied to unit 326. The sensing means carried by arm 321 determines when the sensor arm is aligned with indicator arm 318. Finally, control unit 322 is utilized to actuate valve 324 and interrupt the flow of material to unit 326 when the indicator and sensor arms 318 and 321 are aligned with each other at the desired pre-set position.

As in the system 200 of FIG. 7, system 310 may be arranged to defer operation of pump 313 until a predetermined time interval after sensor arm 321 has started its movement toward the pre-set position corresponding to the quantity of fluid to be delivered. The rate of fluid delivery should be great enough to move indicator arm 318 at a speed at least slightly in excess of the speed of movement of arm 321. The two arms 318, 321 may then come into alignment somewhat before the time that arm 321 reaches the ultimate pre-set position. Under these conditions, valve 324 may be closed a number of times in the latter part of the measuring cycle, so that it is not essential to provide a separate metering valve or other throttling valve. That is, valve 324 functions as a fine control valve as well as a main shut-off.

Of course, the control unit 322 may include a printer to afford a permanent record of the quantities of material delivered to unit 326. The printer may record actual delivery values on a net batch basis or on a cumulative basis, or both, just as in the previous embodiment. Indeed, it is characteristic of the present invention that full data are available, in digital form, relative to the quantities of material the system is set to deliver and the actual quantities delivered, all or any portion of which may be quickly and conveniently recorded by a printer or any other suitable recording device.

Hence, while preferred embodiments of the invention have been described and illustrated, it is to be understood that they are capable of variation and modification, and I therefore do not wish to be limited to the precise details set forth, but desire to avail myself of such changes and alterations as fall within the purview of the following claims.

I claim:
1. A measuring system comprising:
material delivery means, including arresting means for arresting the delivery of material;
means for cumulatively measuring the quantity of material delivered, including an indicator member movable from a reference position along a predetermined path;
a sensor member movable from said reference position along said path;
a reversible servo motor for moving said sensor member along said path;
settable control means for actuating said servo motor to pre-set said sensor member to a predetermined set position on said path representative of a given quantity of material to be measured;
sensing means for determining when said sensor and indicator members are in alignment with each other;
actuating means, interconnecting said sensing means and said arresting means, for actuating said arresting means to arrest material delivery when said indicator and sensor members are aligned with each other;

means, connected to said actuating means, for returning said sensor member to said reference position upon determination that said indicator and sensor members are approximately aligned at said set position;

means, included in said control means, for actuating said servomotor to move said sensor member into accurate alignment with said indicator member;

and means for determining the final position of said sensor member to afford an accurate indication of the quantity of material actually delivered.

2. A measuring system comprising:
material delivery means, including arresting means for arresting the delivery of material;
means for cumulatively measuring the quantity of material delivered, including an indicator member movable along a predetermined path;
a sensor member movable along said path;
a reversible servo motor for moving said sensor member along said path;
settable control means for actuating said servo motor to pre-set said sensor member to a predetermined set position on said path representative of a given quantity of material to be measured, said control means comprising a pulse generator actuated by said motor and a pulse counter coupled to said pulse generator;
sensing means for determining when said sensor and indicator members are in alignment with each other;
means, interconnecting said sensing means and said arresting means, for actuating said arresting means to arrest material delivery whenever said indicator and sensor members are approximately aligned with each other at said set position;
means for subsequently actuating said motor to move said sensor member into accurate alignment with said indicator member at the final position reached by the indicator member;
and means connected to said counter for determining the actual quantity of material delivered.

3. The combination as set forth in claim 2, and further including a printer connected to said pulse counter for printing an indication representative of the position of alignment finally reached by said sensor member and hence representative of the actual quantity of material delivered.

4. A measuring system comprising:
material delivery means, including arresting means for arresting the delivery of material;
means for cumulatively measuring the quantity of material delivered, including an indicator member movable along a predetermined path;
a sensor member movable along said path;
a reversible servo motor for moving said sensor member along said path;
settable control means for actuating said servo motor to pre-set said sensor member to a predetermined set position on said path representative of a given quantity of material to be measured;
sensing means, carried by one of said sensor and indicator members, for determining when said sensor and indicator members are in alignment with each other, said sensing means including two sensing devices displaced a short distance from each other along said path to determine whether said indicator member leads or lags said sensor member;
actuating means, interconnecting said sensing means and said arresting means, for actuating said arresting means to arrest material delivery whenever said indicator and sensor members are approximately aligned with each other, said actuating means preventing restoration of material delivery once said members have reached approximate alignment at said set position;
and means, connected to said control means and said sensing means, for subsequently actuating said servo motor to move said sensor member into accurate alignment with said indicator member to determine whether the quantity of material actually delivered is over or under said given quantity.

5. A measuring system comprising:
material delivery means, including arresting means for arresting the delivery of material;
means for cumulatively measuring the quantity of material delivered, including an indicator member movable along a predetermined path in close proximity to a quantity indicating scale;
a sensor member movable along said path in close proximity to said scale, both said sensor member and said indicator member affording direct indications of material quantities by visual comparison with said scale;
a reversible servo motor for moving said sensor member along said path;
settable control means for actuating said servo motor to pre-set said sensor member to a predetermined position on said path representative of a given quantity of material to be measured;
sensing means for determining when said sensor and indicator members are in alignment with each other;
and means, interconnecting said sensing means and said arresting means, for actuating said arresting means to arrest material delivery whenever said indicator and sensor members are aligned with each other.

6. A weighing system comprising:
material delivery means, including arresting means for arresting the delivery of material, for delivering material to a weighing location;
a weighing mechanism for cumulatively weighing material delivered, said weighing mechanism including a shaft, means for rotating said shaft through an angular displacement proportional to the weight of material delivered, a transparent scale member having annular scale markings coaxially aligned with said shaft, and an indicator arm affixed to said shaft and disposed immediately adjacent said scale member;
a sensor arm mounted for angular displacement about an axis coincident with the axis of said shaft, but independent of shaft movement, immediately adjacent said indicator arm;
a reversible servo motor for rotating said sensor arm;
settable control means for actuating said servo motor to pre-set said sensor arm to a predetermined angular orientation representative of a given weight of material;
sensing means on said arms for determining when said sensor and indicator arms are in alignment with each other;
and means, interconnecting said sensing means and said arresting means, for actuating said arresting means to arrest material delivery whenever said indicator and sensor arms are aligned with each other.

7. A measuring system comprising:
material delivery means for delivering two materials to a common location, including first and second arresting means for arresting the delivery of the respective materials;
means for cumulatively measuring the quantity of material delivered, including an indicator member movable along a predetermined path from a given reference position;
a sensor member movable along said path from said reference position;
a reversible servo motor for moving said sensor member along said path;

settable recording means for recording first and second material quantities;

control means for actuating said servo motor;

means for actuating said control means to pre-set said sensor member to a first set position on said path representative of the quantity of the first material to be measured;

sensing means for determining when said sensor and indicator members are in alignment with each other;

actuating means, interconnecting said sensing means and said arresting means, for actuating said first arresting means to arrest delivery of the first material when said indicator and sensor members are aligned with each other at said first set position;

means for thereafter actuating said control means to pre-set said sensor member to a second set position representative of the quantity of the second material;

and means, included in said actuating means, for actuating said second arresting means to arrest delivery of the second material when said sensor and indicator members are aligned at said second set position.

8. A measuring system comprising:

material delivery means for delivering two materials to a common location, including first and second delivery valves controlling the delivery of the respective materials;

means for cumulatively measuring the total quantity of material delivered, including an indicator member movable along a predetermined path from a given reference position;

a sensor member movable along said path from said reference position;

a reversible servo motor for moving said sensor member along said path;

settable recording means for recording first and second material quantities;

control means for actuating said servo motor to move said sensor member toward a first set position on said path representative of the quantity of the first material to be measured;

means for opening the first delivery valve a predetermined time interval after said sensor member starts movement toward said first set position to initiate delivery of the first material;

sensing means for determining when said sensor and indicator members are in alignment with each other;

actuating means, interconnecting said sensing means and said first valve, for closing said first valve to arrest delivery of the first material whenever said indicator and sensor members are aligned with each other and for finally arresting delivery of the first material when said members are aligned at said first set position;

means for thereafter actuating said control means to move said sensor member toward a second set position representative of the quantity of the second material;

means for opening the second valve a predetermined time interval after said sensor member starts movement toward said second set position;

and means, included in said actuating means, for closing said second valve to arrest delivery of the second material when said sensor and indicator members are aligned at said second set position.

9. A measuring system comprising:

material delivery means, including arresting means for arresting the delivery of material;

means for cumulatively measuring the quantity of material delivered, including an indicator member movable along a first predetermined path and an auxiliary indicator member movable conjointly therewith but along a second predetermined path;

a sensor member movable along said second path and confronting said auxiliary indicator member;

a reversible servo motor for moving said sensor member along said path;

settable electronic control means for actuating said servo motor to pre-set said sensor member to a predetermined set position on said second path representative of a given quantity of material to be measured;

sensing means mounted on one of said sensor and auxiliary indicator members for determining when said sensor and auxiliary indicator members are in alignment with each other at said set position;

and means for returning said sensor member to reference position after alignment has been reached at said set position and for subsequently moving said sensor member back into alignment while accurately measuring the movement necessary for such return to alignment.

10. A scale mechanism for an automatic weighing or like material measuring system of the kind including a rotatable shaft and means for rotating said shaft in proportion to the quantity of material delivered to the system, said scale mechanism comprising:

an indicator arm mounted on said shaft for rotation therewith;

a scale member disposed immediately adjacent said indicator arm, said scale member having a transparent portion with an annular series of scale markings thereon, through which said indicator arm may be viewed to determine visually the quantity of material delivered to the system;

a sensor member;

and means rotatably mounting said sensor member in coaxial relation to said shaft, said sensing member being located immediately adjacent said indicator arm in position for direct visual comparison with the scale markings on said scale member.

11. A scale mechanism for an automatic weighing or like material measuring system of the kind including a rotatable shaft and means for rotating said shaft in proportion to the quantity of material delivered to the system, said scale mechanism comprising:

an indicator arm mounted on said shaft for rotation therewith;

a scale member disposed immediately adjacent said indicator arm, said scale member having a transparent portion with an annular series of scale markings thereon, through which said indicator arm may be viewed to determine visually the quantity of material delivered to the system;

a sensor member;

means rotatably mounting said sensor member in coaxial relation to said shaft, said sensing member being located immediately adjacent said indicator arm in position for direct visual comparison with the scale markings on said scale member;

and photoelectric sensing means, mounted on one of said indicator and sensor members, for sensing when said members are in alignment with each other.

12. A scale mechanism for an automatic weighing or like material measuring system of the kind including a rotatable shaft and means for rotating said shaft in proportion to the quantity of material delivered to the system, said scale mechanism comprising:

an indicator arm mounted on said shaft for rotation therewith;

a scale member disposed immediately adjacent said indicator arm, said scale member having a transparent portion through which said indicator arm may be viewed, and a series of scale markings in an opaque field immediately at one edge of said transparent portion, for determining visually the quantity of material delivered to the system;

a sensor member;

means rotatably mounting said sensor member in coaxial relation to said shaft, said sensing member being located immediately adjacent said indicator arm in position for direct visual comparison with the scale markings on said scale member;

and sensing means for determining when said sensor and indicator members are aligned with each other, said sensing means including at least one photoelectric sensing device and a light source mounted on one of said members and a flag mounted on the other of said members in position to interrupt illumination of said sensing device from said light source when said members are accurately aligned.

13. A scale mechanism for an automatic weighing or like material measuring system of the kind including a rotatable shaft and means for rotating said shaft in proportion to the quantity of material delivered to the system, said scale mechanism comprising:

an indicator arm mounted on said shaft for rotation therewith;

a scale member disposed immediately adjacent said indicator arm, said scale member being opaque throughout most of its area but having a transparent annular portion with an annular series of scale markings on the surface thereof facing said indicator member, through which said indicator arm may be viewed to determine visually the quantity of material delivered to the system;

a sensor member;

and means rotatably mounting said sensor member in coaxial relation to said shaft, said sensing member being located immediately adjacent said indicator arm in position for direct visual comparison with the scale markings on said scale member.

14. The method of measuring delivery of material to a given location comprising:

pre-setting a sensor member to a given position along a predetermined path, representative of a preselected quantity of material to be delivered;

cumulatively measuring the quantity of material actually delivered and moving an indicator member along said path in accordance with such measurement;

interrupting delivery of material to said location when said indicator and sensor members come into approximate alignment at said given position on said path;

moving said sensor member into accurate alignment with said indicator member, after interruption of material delivery;

and measuring the movement of said sensor member required to effect such accurate alignment to determine accurately the actual amount of material delivered.

15. The method of measuring delivery of material to a given location comprising:

pre-setting a sensor member from a reference position to a given set position along a predetermined path, said set position being representative of a preselected quantity of material to be delivered;

cumulatively measuring the quantity of material actually delivered and moving an indicator member along said path in accordance with such measurement;

interrupting delivery of material to said location when said indicator and sensor members come into approximate alignment at said given position on said path;

returning said sensor member to reference position;

again moving said sensor member along said path until it reaches accurate alignment with said indicator member;

and measuring the movement of said sensor member required to effect such accurate alignment to determine accurately the actual amount of material delivered.

16. The method of measuring delivery of material to a given location comprising:

moving a sensor member from a given reference point in a predetermined direction toward a given set position, along a predetermined path, said given set position being representative of a preselected quantity of material to be delivered;

cumulatively measuring the quantity of material actually delivered and moving an indicator member from a given reference point along said path, in said direction, in accordance with such measurement;

interrupting delivery of material to said location whenever said indicator and sensor members come into approximate alignment at any position on said path beyond said reference points;

moving said sensor member into accurate alignment with said indicator member, after said sensor member has reached said set position and after interruption of material delivery has been effected;

and measuring the movement of said sensor member required to effect such accurate alignment to determine accurately the actual amount of material delivered.

17. The method of measuring delivery of material to a given location comprising:

moving a sensor member from a given reference position and in a predetermined direction toward a given set position, along a predetermined path, said set position being representative of a preselected quantity of material to be delivered;

cumulatively measuring the quantity of material actually delivered and moving an indicator member from said reference position along said path, in said direction, in accordance with such measurement;

interrupting delivery of material to said location whenever said indicator and sensor members come into approximate alignment at any position on said path beyond said reference point;

moving said sensor member in either direction along said path and into accurate alignment with said indicator member, after said sensor member has reached said set position and after interruption of material delivery has been effected at that position of said sensor member;

and measuring the direction and amplitude of movement of said sensor member required to effect such accurate alignment to determine accurately the actual amount of material delivered.

18. The method of measuring delivery of material to a given location comprising:

moving a sensor member from a given reference position and in a predetermined direction toward a given set position, along a predetermined path, said set position being representative of a preselected quantity of material to be delivered;

initiating delivery of material to said location a predetermined time delay interval after said sensor member is started moving toward said set position;

cumulatively measuring the quantity of material actually delivered and moving an indicator member from reference position along said path, in said direction, in accordance with such measurement, the rate of material delivery being such that the indicator member moves faster than the sensor member;

interrupting delivery of material to said location temporarily whenever said indicator and sensor members come into alignment at any position on said path beyond reference position;

and finally interrupting delivery of material when said indicator and sensor members reach alignment at said set position.

19. A measuring system comprising:

material delivery means, including arresting means for arresting the delivery of material;

means for cumulatively measuring the quantity of material delivered, including an indicator member movable along a predetermined path in accordance with a non-linear relationship only approximately proportional to the quantity of material delivered;
a sensor member movable along said path;
a reversible servo motor for moving said sensor member along said path;
settable control means for actuating said servo motor to pre-set said sensor member to a predetermined position on said path representative of a given quantity of material to be measured said control means comprising a pulse generator calibrated in accordance with said non-linear relationship of said indicator member to the quantity of material delivered, and a pulse counter coupled to said pulse generator, and means for pre-setting said counter to a count representative of the quantity of material to be delivered;
sensing means for determining when said sensor and indicator members are in alignment with each other;
and means, interconnecting said sensing means and said arresting means, for actuating said arresting means to arrest material delivery whenever said indicator and sensor members are aligned with each other.

References Cited in the file of this patent

UNITED STATES PATENTS

| | | |
|---|---|---|
| 2,793,000 | Klein et al. | May 21, 1957 |
| 2,801,819 | Lindars | Aug. 6, 1957 |